(12) United States Patent
Clamp et al.

(10) Patent No.: US 8,317,323 B2
(45) Date of Patent: Nov. 27, 2012

(54) CONTACT LENS AND METHOD OF MANUFACTURE

(75) Inventors: John Clamp, Cambridge (GB); Richard Gordon Newell, Cambridge (GB)

(73) Assignee: Contact Lens Precision Laboratories Ltd., Bedfordshire (GB)

( * ) Notice: Subject to any disclaimer, the term of this patent is extended or adjusted under 35 U.S.C. 154(b) by 90 days.

(21) Appl. No.: 12/879,191

(22) Filed: Sep. 10, 2010

(65) Prior Publication Data
US 2012/0062835 A1    Mar. 15, 2012

(51) Int. Cl.
*G02C 13/00*    (2006.01)
(52) U.S. Cl. .......................... 351/159.74; 351/159.78
(58) Field of Classification Search .............. 351/160 H, 351/177, 159.02–159.38, 159.73–159.79
See application file for complete search history.

(56) References Cited

U.S. PATENT DOCUMENTS 7,052,133 B2 *  5/2006  Lindacher et al. ............ 351/161
7,147,325 B2 * 12/2006  Gotou et al. ............... 351/160 R

* cited by examiner

*Primary Examiner* — Darryl J Collins
(74) *Attorney, Agent, or Firm* — Barnes & Thornburg LLP (57) ABSTRACT

The invention relates to a method of designing a soft contact lens, said lens having a central optic zone and with a peripheral zone around the central optic zone;
the method comprising the steps of:
  (a) defining a back surface of the lens which is a satisfactory fit to the surface of a subject's cornea;
  (b) defining a front surface of the lens over at least the central optic zone, which surface is selected so as to ameliorate the subject's vision defects;
  (c) checking that the lens meets a desired range of thickness values at one or more selected parts of the lens and, if not, recalculating the front surface over at least the central optic zone so as to meet said desired thickness value range,
wherein the lens is to be made of a substance having a Young's modulus in the range 0.08 to 0.40 MPa, and wherein the junction thickness of the lens is in the range 0.15-0.40 mm.

16 Claims, 8 Drawing Sheets

CONTACT LENS AND METHOD OF MANUFACTURE

FIELD OF THE INVENTION

This invention relates to a method of designing and of manufacturing a contact lens, and to a contact lens manufactured by the method.

BACKGROUND OF THE INVENTION

Defects in vision include myopia, hypermetropia and astigmatism. These are all very common defects, and are readily correctable by spectacles or contact lenses, which may be "rigid" or "soft". Rigid contact lenses have a water content of less than 5%, whilst soft contact lenses generally have a water content of 20% or more.

Defects in human vision may also arise from other causes including: corneal transplants, accident, post laser eye surgery problems and ocular diseases including keratoconus. The latter condition is characterised by a localised thinning of the cornea, which leads to outward bulging of the cornea due to the pressure exerted thereon by the fluid between the cornea and the lens of the eye. This bulging of the cornea causes it to depart from the ideal asphericity, and so causes defective vision.

Keratoconic visual defects cannot be satisfactorily corrected by spectacles. Contact lenses have been used to help patients suffering from reduced visual acuity due to abnormal corneal surfaces caused by diseases such as keratoconus, post-operative corneal trauma and accidental corneal trauma.

Generally, conventional practice has been to prescribed patients with keratoconic defects hard contact lenses, especially "rigid gas permeable" (RGP) lenses. Because of their rigidity, these lenses can bridge over the distortions of the cornea, allowing the tears to fill voids between the lens and cornea. The refractive index of the tear is considered, by conventional wisdom, to be similar to, but not exactly the same as, both the front of the cornea and the contact lens. The anterior surface of the contact lens replaces the front of the cornea and becomes the main refractive element of the patient's eye. It is therefore important that this surface remains optically well defined.

This conventional method therefore relies on a contact lens being rigid enough to support itself over the distortions of the cornea, resisting the capillary forces of the tear layer, and not allowing these distortions to be transferred to the front surface of the contact lens. Therefore RGP contact lenses are mainly used to ensure that the lens retains its form on the eye.

However, the requirement that the contact lens needs to be rigid, coupled with the abnormal distortion of the cornea, means that the fitting of such rigid lenses for subjects of this sort is extremely difficult. The contact lens fitter is faced with sometimes insurmountable conflicting requirements of: (1) achieving good optical performance, (2) reducing the traumatic effects of the contact lens on the cornea, and (3) providing a lens to the patient that is tolerably comfortable, and (4) ensuring that no damage is done to the cornea as a rigid material on thinning tissue can cause abrasion and scarring.

To achieve this fit, it is typical for the contact lens fitter to use many trial lenses to review the fit and repeat order a number of specialist lenses from contact lens manufacturers. This is clearly inefficient, expensive and time-consuming, and can cause a lot of discomfort for the subject.

Accordingly, the present inventors have explored alternatives which, contrary to received wisdom, utilise soft contact lenses. There are some prior publications which disclose the design of soft contact lenses to treat, inter alia, keratoconic defects. These include WO2009/053755.

Intuitively, those skilled in the art would consider that, in general terms, the thicker such a soft lens is, the better its optical performance, as being better able to withstand the forces placed on it by the irregular shape of the patient's cornea. Equally, those skilled in the art would intuitively consider that, the more rigid the lens, the better its optical performance in situ, for the same reasons.

SUMMARY OF THE INVENTION

In a first aspect the invention provides a method of designing a soft contact lens, especially a soft contact lens for ameliorating visual defects arising from corneal irregularities, said lens having a central optic zone, which is that part of the lens which is substantially responsible for correcting the subject's vision defects, and with a peripheral zone around the central optic zone;
the method comprising the steps of:
(a) defining a back surface of the lens which is a satisfactory fit to the surface of a subject's cornea;
(b) defining a front surface of the lens over at least the central optic zone, which surface is selected so as to ameliorate the subject's vision defects;
(c) checking that the lens meets a desired range of thickness values at one or more selected parts of the lens and, if not, recalculating the front surface over at least the central optic zone so as to meet said desired thickness value range,
wherein the lens is to be made of a substance having a Young's modulus in the range 0.08 to 0.40 MPa, preferably in the range 0.15 to 0.39, more preferably in the range 0.20 to 0.39, and most preferably in the range 0.20 to 0.38 MPa, and wherein the junction thickness of the lens (defined as being the thickness of the lens at the junction of the central optic zone with the peripheral zone) is in the range 0.15-0.40 mm, preferably in the range 0.20-0.40 mm, more preferably in the range 0.25-0.35 mm.

By way of explanation, a typical contact lens has a diameter in the range 12-18 mm. The central optic zone is usually a circular zone of about 7.5-9.0 mm diameter which, when in situ, overlies the pupil of the subject's eye. The peripheral zone is that part of the lens outside the central optic zone.

The back surface of the lens, which contacts the subject's cornea, may be defined according to any of the various parameters conventionally used in the art. For example, the back surface may be defined to provide a satisfactory fit based on analysis and/or measurements of the subject's eye performed or provided by a practitioner. Such analysis may be performed by an optometrist for example, using a corneal topographer, but any other suitable method/apparatus may be employed.

In the present invention, it is particularly preferred that the posterior surface of the peripheral zone of the lens is selected to give a good fit to the subject's cornea, so as to provide good support to the central optic zone which, due to the subject's corneal irregularities, may not have such a close fit with the cornea.

Thus, in a preferred embodiment, the design of the lens takes account of the shape of the cornea of the subject's eye to provide optimal fit of the lens in its peripheral zone to the subject's cornea. One preferred method of achieving this is described by the inventor as "sector management control".

In a preferred embodiment, the method of the invention comprises the additional step of:
defining one or more positions or loci within the peripheral zone of the lens, and adjusting the sagittal depth of the lens at the one or more defined positions or loci so as to improve the fit of the peripheral zone of the lens to the subject's cornea.

The adjustment is typically applied only to the posterior surface of the lens and, being outside the optic zone, does not require any compensating correction to the front surface geometry of the lens to adjust the optics of the lens.

In some embodiments, the sagittal depth of the peripheral zone of the lens maybe determined by fitting one or more Fourier series to circular rings of measured points from a clinical source such as a mould of the eye, or from extended corneal topography. The diameter of these circular rings may be defined as the diameter of the contact lens to be prescribed, or some value between the optical zone diameter of the contact lens to the total diameter of the lens.

The portions of loci may be joined to non-adjusted 'default' portions of the lens by smoothed or blended curves. The portions or loci of the peripheral zone of the lens which have an adjusted sagittal depth may be very small (e.g. essentially points) and may be very numerous (e.g. from 50 to 100). In a preferred embodiment however, a default sagittal depth is applied to the peripheral zone of the contact lens and a variation in sagittal depth is then applied to one or more defined sectors. The varied sectors may be almost any size, between about 5° and 270°, but will typically be between 10° and 180°, preferably between 15° and 120°. The sectors can be of different sizes and be at any position about the lens. Typically the sagittal depth variation is applied to one or two defined sectors of the peripheral zone, but if the subject's cornea is of especially unusual shape and/or an especially good fit of the lens to the cornea is desired, a greater number of sectors may be defined. A different variation in depth may be applied to each of the defined sectors.

Preferably a blended curve is provided between the defined sectors, to provide a smooth surface to the lens. The use of defined 'sectors' in this way is referred to by the inventor as Sector Management Control ("SMC") and provides a simple system for obtaining improved fit of the peripheral zone of the contact lens to the cornea.

The design of the peripheral zone of the lens may be determined, in part, by readings or measurements taken by an optometrist examining the subject using, for example, a corneal topographer. Thus, in some embodiments, the portions, loci or sectors of the peripheral zone of the lens will be defined by an optometrist or by the lens manufacturer in response to data provided by an optometrist.

The outermost 1 mm or so of the peripheral zone is, however, preferably provided with a posterior surface which is flattened, relative to the surface of the subject's cornea, to prevent the lens being sucked against the cornea by the adhesion of the tear layer. This is known as an "edge lift" and is conventional in contact lens design.

In some embodiments, the posterior surface of the lens is selected from a finite number of pre-existing standard geometries. The selected standard geometry may be applied to the posterior surface of the lens "as is" or, if desired, may be adjusted to provide an improved fit to the corneal topography of the particular subject. Methods of designing the posterior topography of the lens are disclosed and described in detail in WO2009/053755, the entire content of which is herein specifically incorporated by reference.

The front or anterior surface of the optic zone of the lens is defined so as to offset the subject's corneal irregularities and thereby ameliorate the subject's vision defects. Various methods of designing an appropriate anterior surface for the lens will be apparent to those skilled in the art. Preferably a wavefront is used to model the path of light rays through the subject's cornea and the proposed contact lens, in order to determine a suitable anterior surface for the lens. The method may also include, inter alia, design based on direct measurement using an aberrometer, to address lower and/or higher order aberrations, or calculation of sphere and cylinder refraction details (e.g. from a standard eye test performed on the subject) to derive coefficients for defocus, prism and astigmatism.

The calculation method to determine the defocus, prism and astigmatic coefficients from sphere and cylinder refraction details may conveniently comprise, but is not limited to, creating a wavefront using a bi-conic toric equation and representing this equation as a series of points, fitting the series of Zernike equations to the set of points and using a method of least squares to determine the individual Zernike coefficients.

The calculation method to determine the coma coefficients from the topography map preferably comprises, but is not limited to, representing the topography as a series of points, fitting the series of Zernike equations to the set of points and using a method of least squares to determine the individual Zernike coefficients.

The wavefront is refracted back through the anterior surface of the cornea, into the corneal tissue. The method advantageously comprises, but is not limited to, initially converting the series of points from which to topography is defined into a series of bi-cubic surfaces, determining the slopes at each point as a series of simultaneous equations so that the surface is continuous to the second order and refracting the wavefront into the cornea using the derivates of the bi-cubic surface to recreate the wavefront.

The method may preferably be adapted to take account of the slight refraction which takes place when the light passes from the cornea into the tear layer, and again when passing from the tear layer into the contact lens. Although the refractive indices of these materials are similar, they are not identical, so by definition some refraction must occur. Again, the reader is referred to the content of WO2009/053755 for further detail on this point.

The present inventor has found that, contrary to the expectation of those skilled in the art, optimum performance of contact lenses, in terms of measured visual acuity of subjects with a keratoconic condition, is obtained using soft contact lenses with a junction thickness no greater than about 0.40 mm and no less than about 0.15 mm, more preferably no less than 0.20 mm, and using lenses having a Young's modulus in the range 0.08 to 0.40 MPa, most preferably in the range 0.20 to 0.38 MPa. This combination of features gives unexpectedly good optical performance whilst preserving optimal perceived comfort for the users.

In a second aspect the invention provides a method of making a soft contact lens, the method comprising the steps of:
(a) designing a soft contact lens according to the method of the first aspect defined above; and
(b) making the designed lens, having the designed front and back surfaces, using a material having a Young's modulus in the range 0.08-0.40 MPa.

Preferably the material has a Young's modulus in the range 0.15 to 0.39, more preferably in the range 0.20 to 0.39, and most preferably in the range 0.20 to 0.38 MPa.

Suitable materials are known to those skilled in the art and include, inter alia, hydrogels, especially silicone hydrogels such "Definitive"™ made by Contamac Ltd., UK.

In a third aspect, the invention provides a soft contact lens, especially a soft contact lens adapted and configured to ameliorate vision defects in a subject arising from irregularities of the corneal topography, the lens having a junction thickness in the range 0.15 mm-0.40 mm, and having a Young's modulus in the range 0.08 to 0.40 MPa.

More especially, the lens preferably has a junction thickness in the range 0.20-0.40 mm, most preferably in the range 0.25-0.35 mm.

More especially the lens preferably has a Young's modulus in the range 0.15 to 0.39, more preferably in the range 0.20 to 0.39, and most preferably in the range 0.20 to 0.38 MPa.

The lens is preferably designed and/or manufactured by the method of the first or second aspects of the invention, as appropriate, as defined above.

The lens is preferably prismatic i.e. the optical centre of the front surface of the lens is offset relative to the optical centre of the rear surface. The front surface of the lens is preferably also toric.

It will generally be preferred, especially if the lens is prismatic, to provide one or more stabilising features on the front of the lens to improve the rotational and/or lateral stability of the lens. Such features may include wedge portions or the like, and are conventional contact lens design features well-known to those skilled in the art.

In a further aspect, the invention provides a method of treating a vision defect in a subject with such a vision defect caused by corneal irregularity, in particular a vision defect caused by keratoconus, the method comprising the step of providing at least one soft contact lens having a shape adapted to fit an eye of the subject and to ameliorate the vision defect, the lens having a Young's modulus in the range 0.08 to 0.040 MPa and a junction thickness in the range 0.15-0.40 mm. The lens will preferably have a modulus in the range 0.15 to 0.39, more preferably in the range 0.20 to 0.39, and most preferably in the range 0.20 to 0.38 MPa. The lens will preferably have a thickness in the range 0.20-0.40 mm, more preferably in the range 0.25-0.35 mm.

The lens will advantageously have a toric front surface and be prismatic.

The lens provided to the subject will conveniently be designed and/or manufactured according to the first and/or second aspects of the invention as defined above, as appropriate.

The method of treating the vision defect may also further comprise the step of using an optical coherence tomographer (OCT), which allows the eye and contact lens in combination to be viewed in any medial section. The same apparatus may be used in the design and/or manufacture of the lens, to enable the fit of the lens to be checked and the lens design to be adjusted if necessary.

A further advantage of the invention is that the optic zone of the lens may be kept relatively thin. This means that the actual contact lens supplied to the practitioner will be a closer approximation to the thickness of a trial lens which will have been used by the practitioner when determining an appropriate fit for the subject.

By way of explanation, it is often the case that afocal plano trial lenses (i.e. lenses without any optical power) may be used to assess the fit to a subject's cornea. For subjects who do not require a corrective lens with a high optical power this does not present any difficulty. However, for some subjects (e.g. with a large over-refraction due to keratoconus) a high optical power corrective lens is required, which means in turn that the corrective lens may be much thicker than the afocal trial lens, especially at the junction of the optic zone with the peripheral zone.

This can adversely affect the fit of the lens. ('Fit' in this context encompasses in particular the interaction of the contact lens with the subject's eye lids, and upper eye lid in particular, the closing of which typically causes the lids to bear on the lens in such a way as to rotate the lens into, and maintain it within, the desired position on the subject's eye).

The present invention allows the design of lenses with a thinner optical zone, by optimising the fit of the peripheral zone of the lens to the subject's cornea, such that the overall sagittal thickness of the lens (especially at the junction of the optic and peripheral zones) can be closer to that of the typical trial lens (about 0.4 mm) and thus deviates less from the fit expected as a result of the findings from the trial lens.

BRIEF DESCRIPTION OF THE SEVERAL VIEWS OF THE DRAWINGS

The invention will now be further described by way of illustrative example, and with reference to the accompanying drawings, in which.

DETAILED DESCRIPTION OF THE INVENTION

Determination of Optimal Ranges of Junction Thickness and Material Elastic Modulus for Soft Contact Lenses Methodology To determine the optimal values for the design parameters of junction thickness and material elastic modulus (Young's modulus), a number of patients were fitted with soft lenses incorporating a variation of these parameters and assessed in terms of visual acuity and comfort. Each of the patients had been diagnosed as having an irregular cornea and/or keratoconic condition in at least one eye.

Preparation of Lenses

Suitable soft lenses were manufactured using a lathe cutting technique in the dry form. Initially the design of the lens was determined using software to calculate the surfaces of the lens using the design method disclosed in this document. Values of junction thickness and the values that relate to the contact lens material to be used are entered into the software program, along with the values for the standard contact lens parameters that relate to the specific patient being fitting. These parameters include the required power of the contact lens in sphero-cylinderical form, the axis of the contact lens, the base curve of the contact lens, the total diameter of the contact lens and the fitting options.

The values of minimum centre thickness used were as per table 1 below:

TABLE 1

| Junction thickness |
|---|
| 0.20 |
| 0.25 |

TABLE 1-continued

| Junction thickness |
|---|
| 0.30 |
| 0.40 |

Each contact lens material employed exhibited a different modulus, and the range of materials used was as per table 2 below:

TABLE 2

| Material | Modulus (MPa) |
|---|---|
| Benz UO2 | 0.08 |
| *Definitive V2 | 0.27 |
| *Definitive V1 | 0.39 |
| 67% VP | 0.37 |
| **77% VP | 0.25 |
| Benz 3X | 0.51 |

*Both made in UK
**by Contamac Ltd.

The software program calculates the optimal design of the contact lens incorporating the values for the input parameters, and converts the surfaces into a format that the lathe can read. The lenses were manufactured on Sterling Inc. Optoform 80 lathes using FTS 1000 fast tool servo, and the lathe files created in the proprietary minifile format.

Once the lenses were manufactured in the dry form, they were hydrated using borate buffered saline solution w/v 0.9%, and fully inspected using standard contact lens inspection equipment (focimeters to verify power and Optimecs to verify base curve, diameter and centre thickness) to ensure the values of the input parameters specified were within tolerance of the final inspection values.

Clinical Assessment

During standard contact lens fitting consultations, the lenses of differing materials and differing junction thicknesses were fitted to specific patients, and assessed using normal contact lens consultation criteria. These criteria includes a determination of visual acuity (VA) using the standard optometric technique of reading letters from a LogMar test chart, and subjective comfort using a score of 1 to 10.

Following the contact lens consultations, the contact lens practitioners compiled a spreadsheet containing an anonymous patient identifier, the details of the lenses being fitting and the resulting VA and comfort levels. When testing the effect of varying the lens thickness parameter, all lenses were tested using a constant modulus value (0.39 MPa). Conversely, when investigating the effect of varying the lens modulus parameter, all lenses were tested at a constant thickness (0.40 mm). The results are shown in FIGS. 1-4.

Figure 1:
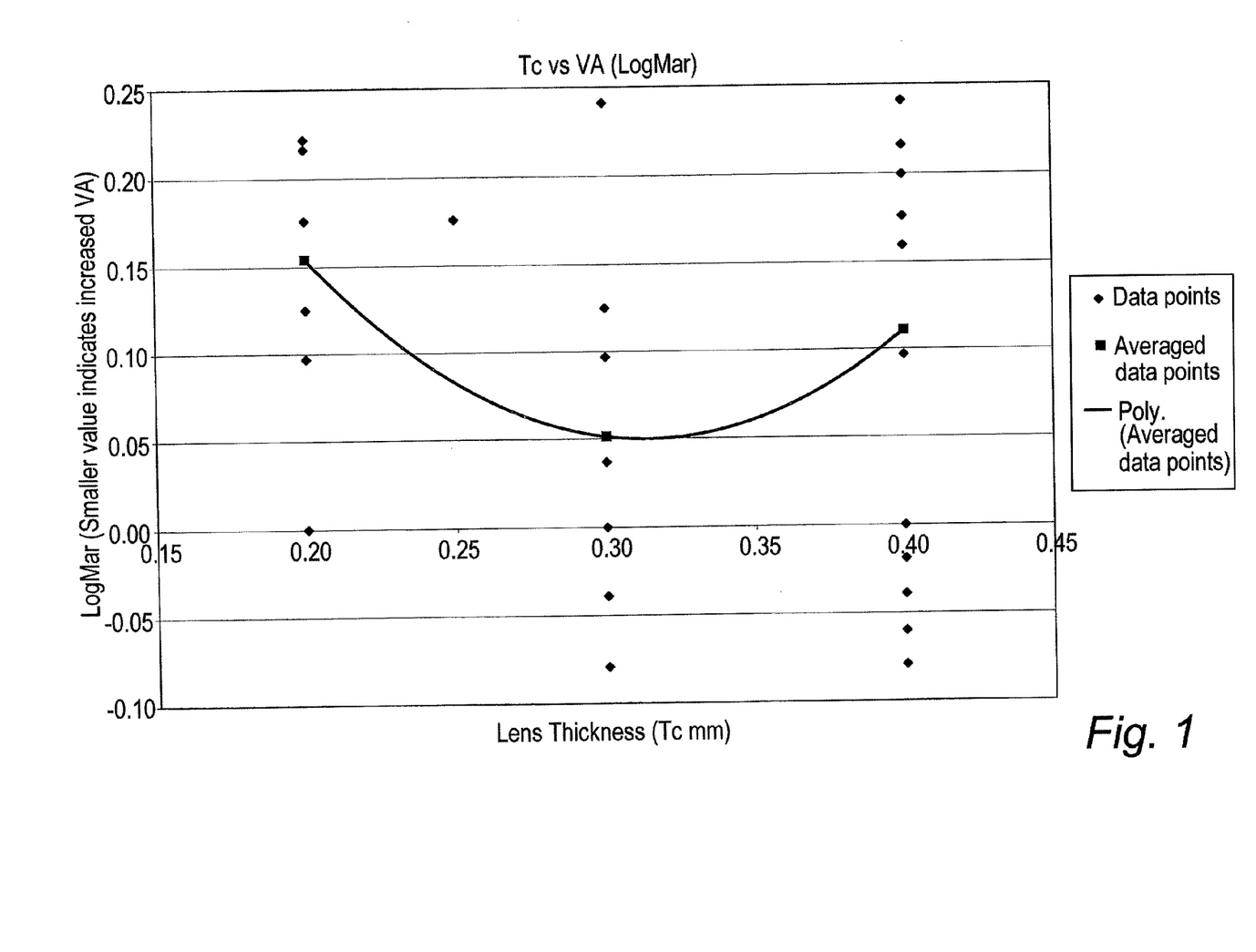
FIG. 1 is a graph of LogMar against contact lens thickness.

FIG. 1 is a plot of LogMar against lens thickness (in mm). In FIG. 1 (and in FIGS. 2-4 also), individual data points are shown by lozenge symbols, averaged values are denoted by squares, and the curve connects the averages. The LogMar value is inversely proportional to visual acuity, thus the lower the LogMar value the higher the visual acuity. As can immediately be seen from the figure, contrary to expectation, visual acuity did not increase in a manner proportional to lens thickness. Instead, visual acuity peaked at a lens thickness of about 0.31 or 0.32 mm, with visual acuity diminishing for either thinner or thicker lenses. A preferred lens thickness of about 0.25-0.35 mm gave very good VA results.

Figure 2:
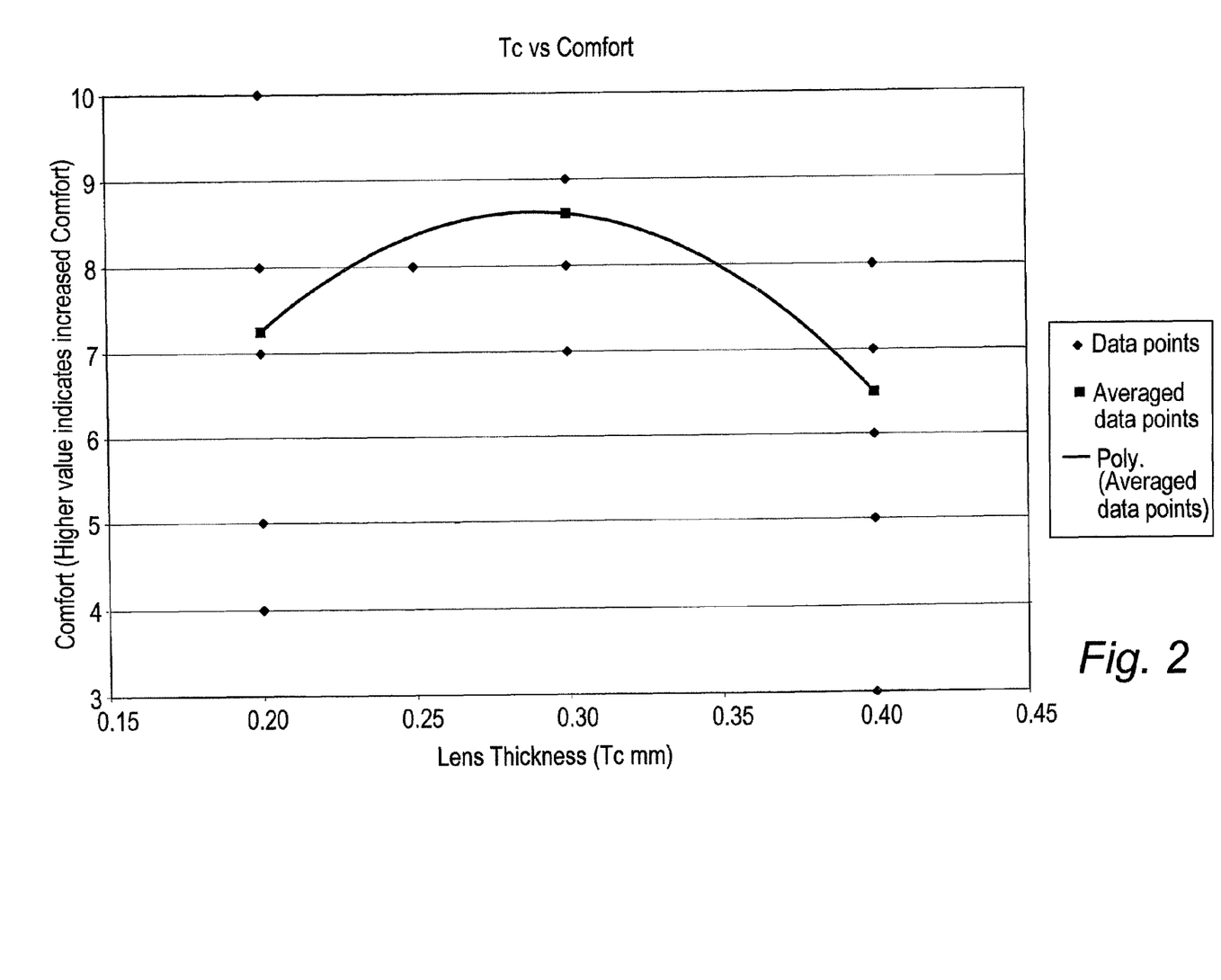
FIG. 2 is a graph of comfort against contact lens thickness.

FIG. 2 is a graph of perceived comfort (as a scale of 1-10 arbitrary units) against lens thickness (in mm). The resulting plot was very similar, with maximum perceived comfort again being in the range 0.25-0.35 mm.

Figure 3:
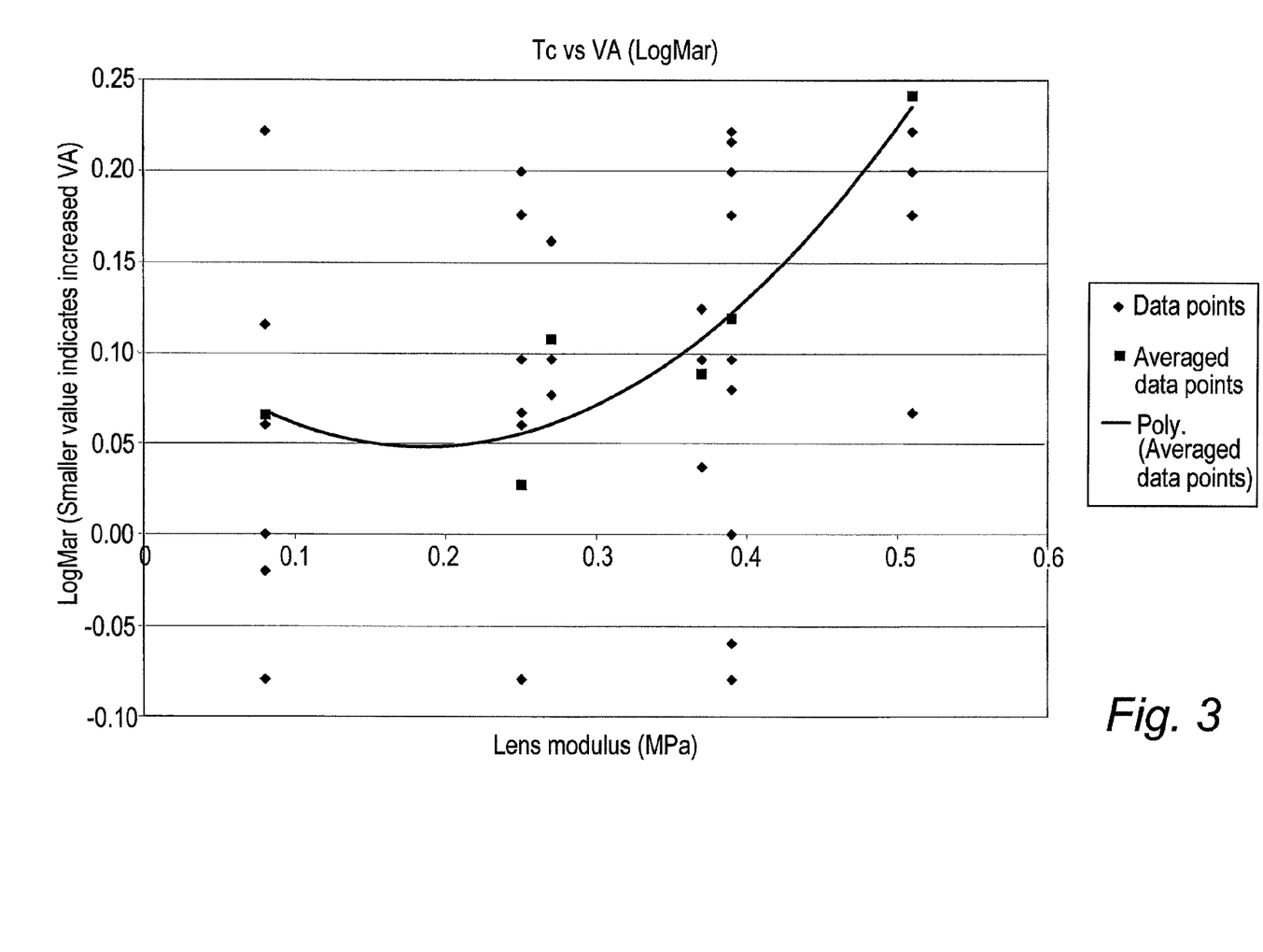
FIG. 3 is a graph of LogMar against contact lens material modulus.
Figure 4:
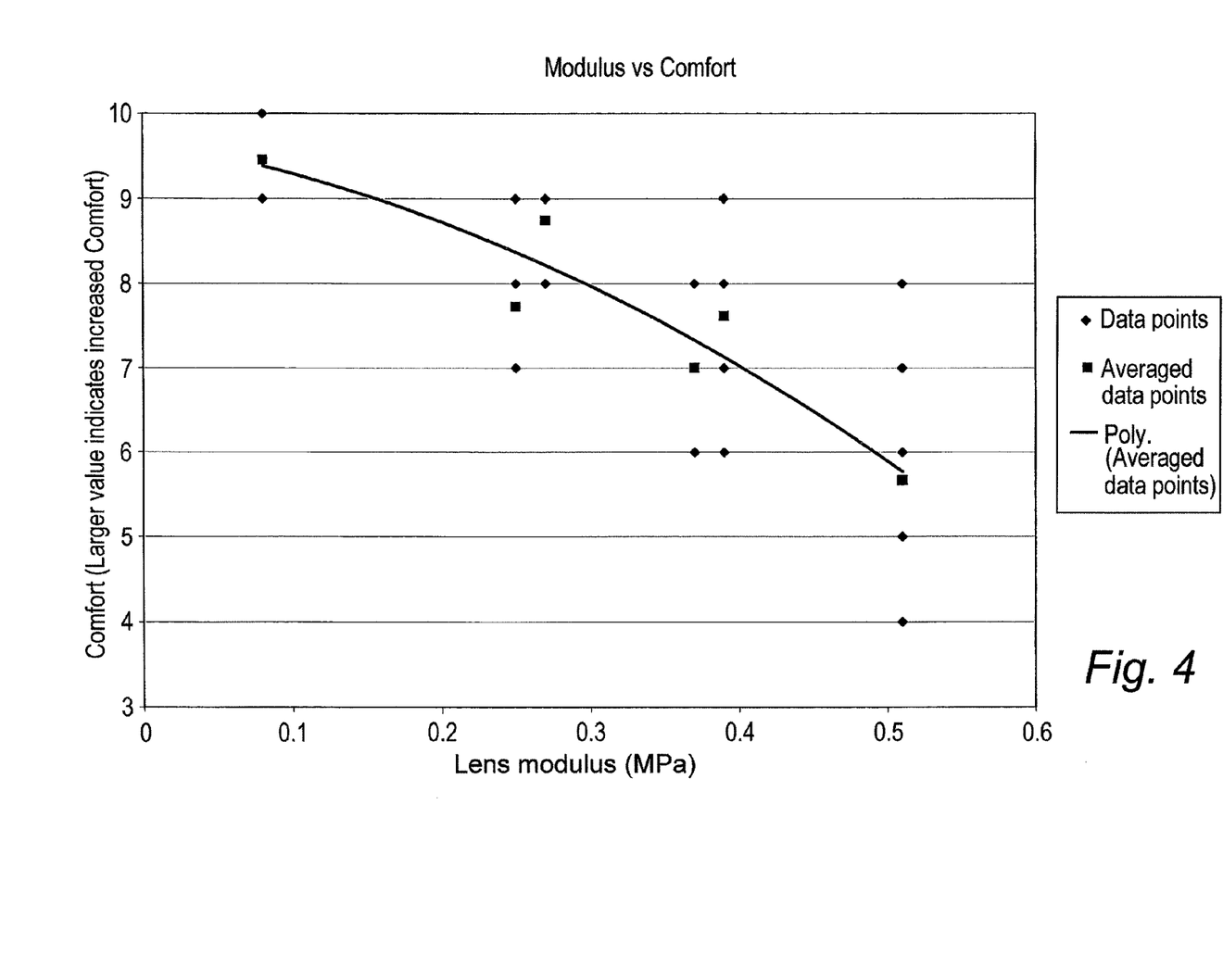
FIG. 4 is a graph of comfort against contact lens material modulus.

FIGS. 3 and 4 show the results for the investigation in to the effect of varying the Young's modulus of the lens material.

FIG. 3 is a graph of LogMar against lens modulus (MPa). Again, entirely contrary to expectation, visual acuity (as measured by LogMar) did not increase with increasing rigidity of the lens. Instead, optimum optical performance of the lens was achieved using a lens with a modulus in the range 0.08 to 0.40 MPa, with best results in the range 0.15 to 0.35, more especially 0.20 to 0.35.

FIG. 4 is a graph of perceived comfort (arbitrary units) against lens modulus (MPa). This graph showed results largely as expected, with perceived comfort being inversely related to rigidity of the lens material, with the Benz $UO_2$ (having a modulus of 0.08) being perceived as the most comfortable lens and the Benz 3x (with a modulus of 0.51) being perceived as the least comfortable.

Example 2

This example describes a preferred feature of the invention, ("sector management control"), in which the sagittal depth of the peripheral zone of the lens is adjusted to improve the fit of the peripheral zone of lens to a subject's cornea.

Figure 5:
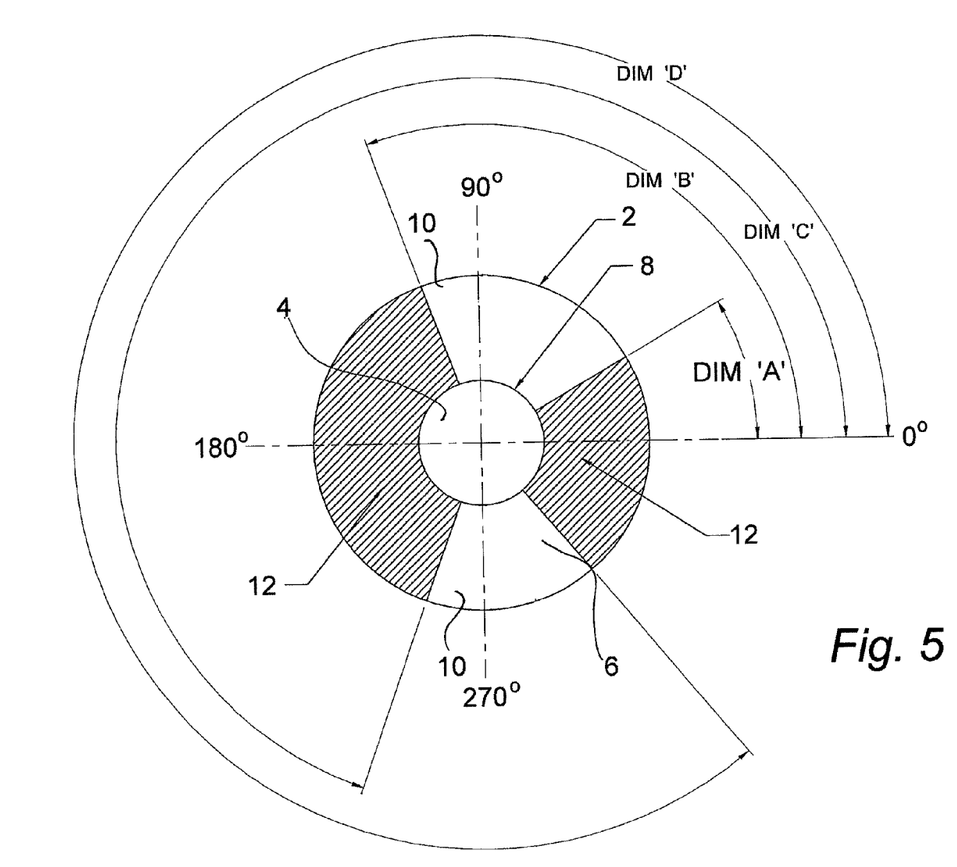
FIGS. 5 and 6 are plan views of two different embodiments of a contact lens in accordance with the invention.

Referring to FIG. 5, a lens (2) comprises a central, circular optic zone (4) and a peripheral zone (6) disposed around the optic zone, the junction between the central zone (4) and the peripheral zone (6) denoted by reference numeral (8). The angular position of positions around the lens is conventionally defined by reference to a horizontal line passing through the centre of the lens, with 0° at the right hand end of the horizontal line.

The peripheral zone of the lens is divided into two sectors (10) of default sagittal depth, and two sectors (12), shown shaded, with have a sagittal depth which may be greater or less than the default depth. An optometrist or other individual provided with information regarding the shape of the subject's cornea defines the desired sagittal depth of the sectors of the peripheral zone, whether in absolute or in relative terms, and the angular start/end positions of the sectors.

Figure 6:
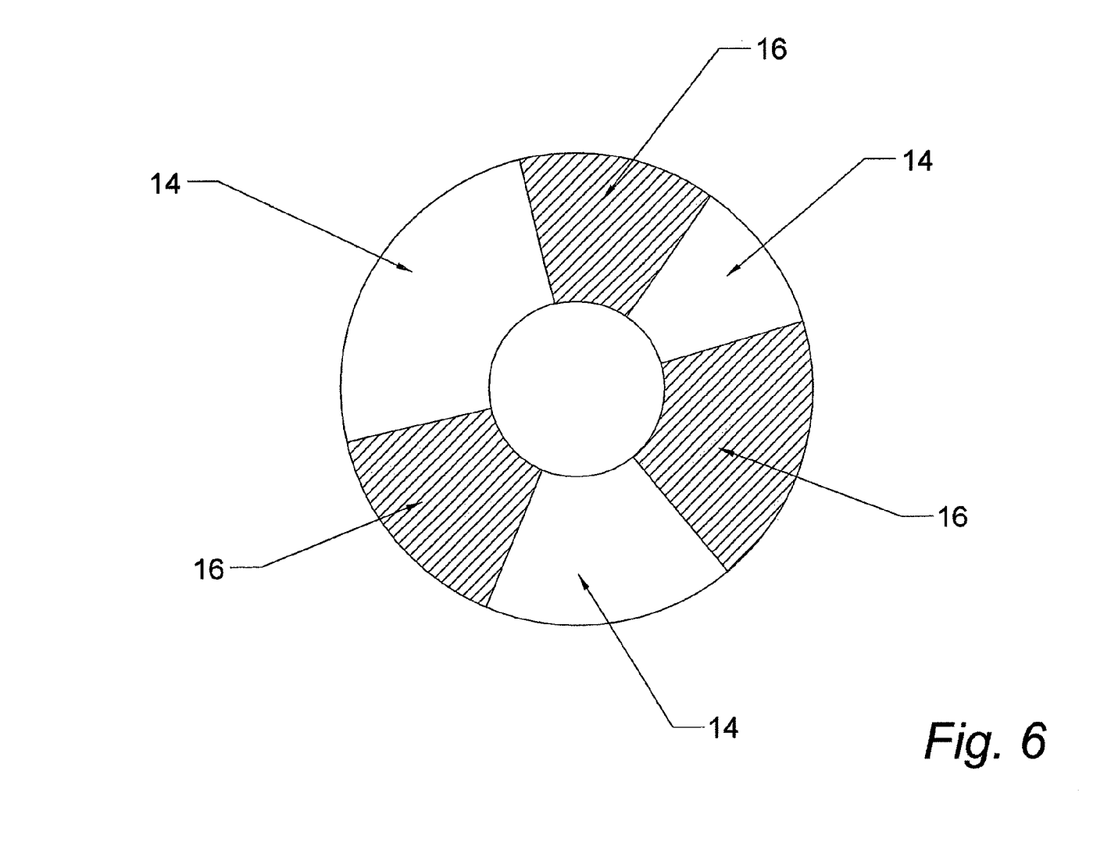

FIG. 6 shows a similar embodiment, but one in which there are three sectors (14) of default sagittal depth and three sectors (16) of defined sagittal depth, which may be the same or different in depth to the other sectors (16).

Figure 7:
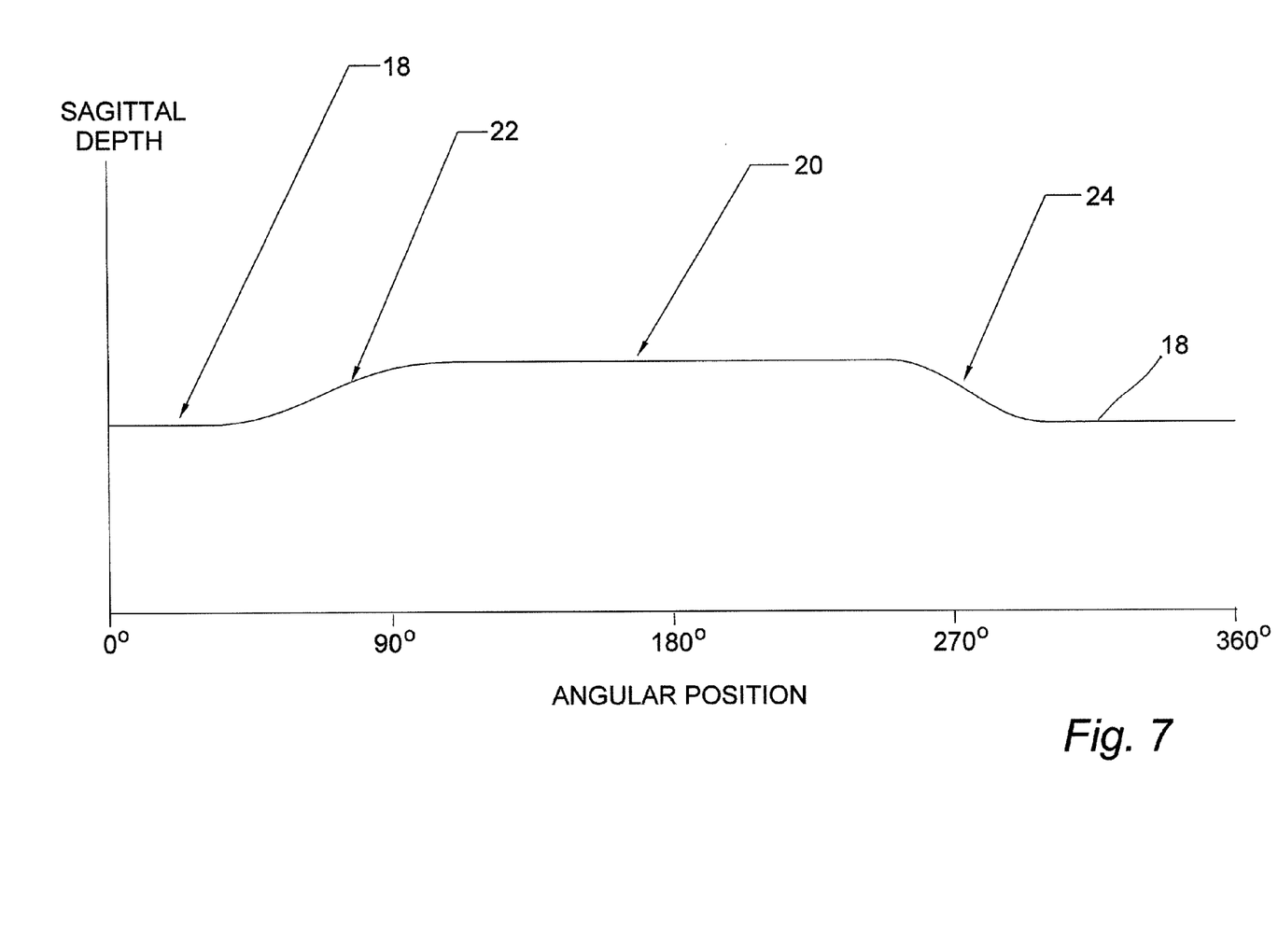
FIG. 7 is a graph of sagittal depth against angular position.

FIG. 7 is a graph of sagittal depth of the peripheral zone of a lens (designed in accordance with the invention) against angular position. Note that the graph plotted in FIG. 7 does not represent the embodiments illustrated in FIG. 5 or 6. the lens has two sectors (18) of a default sagittal depth, and a sector (20), from about 90° to about 260°, having a greater sagittal depth, with the different sectors (18) and (20) being joined by a smooth blended curve (22, 24).

Example 3

Figures 8, 9, 10:
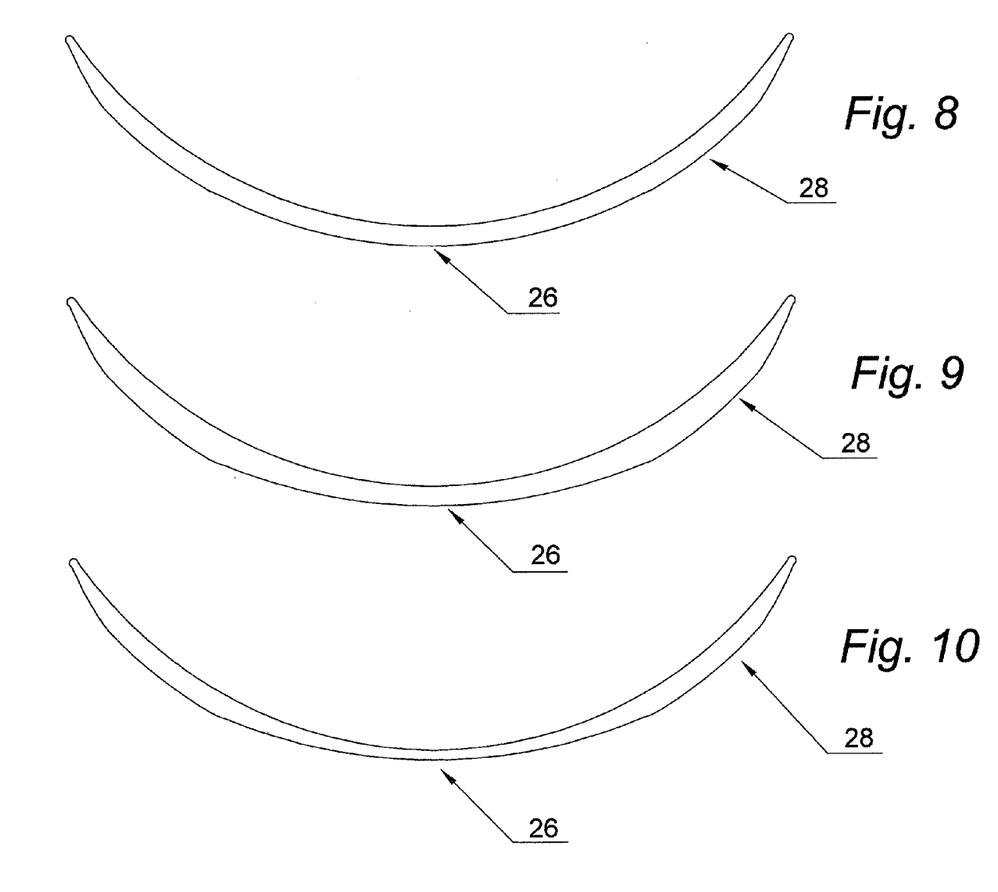
FIGS. 8-10 are transverse medial sections through various contact lenses.

This example illustrates an advantage of the invention. FIG. 8 is a transverse medial section through a conventional afocal trial lens used for test fitting purposes. In the optic zone (26), the front and near surfaces of the lens are of equal radius of curvature, so there is not net refraction.

FIG. 9 is a transverse medial section through a conventional prior art lens of high optical power. As a result of the larger radius of curvature applied to the front surface of the optic zone (26), the sagittal depth of the peripheral zone of the lens (28) is significantly thicker than that of the peripheral zone (28) of the test lens (depicted in FIG. 8). As a result, the corrective lens may not fit the subject as well as would be expected from the analysis performed using the trial lens. ("Fit", in this context, also encompassing the interaction between the lens and the subject's eyelids).

FIG. 10 shows a transverse medial section through a corrective lens designed in accordance with the present invention. The design calls for a much thinner optic zone (26) than is prescribed for conventional contact lenses intended to correct keratoconus. As a result the peripheral zone (28) of the corrective lens can be much thinner than that of the conventional lens shown in FIG. 9, and much more closely resembles the sagittal depth of the peripheral zone (28) of the trial lens depicted in FIG. 8. The fitting of the lens of the invention thus more closely replicates that of the trial lens.

Example 4

History

KB is a 28 year old male. He had been considered amblyopic in the right eye for many years until he was diagnosed with keratoconus in 2009, when he sought help as his left eye began to deteriorate. Six months prior to his appointment he had attempted to wear RGP lenses, but discontinued due to intolerance and had managed with spectacles since that time. The keratoconus in his left eye had been actively progressing for six months and he was therefore considering CXL treatment for this eye.
Initial Findings
Spectacle Refraction
RE: −4.00/−4.25×55 VA 6/60 LE: −5.50−5.00×101 6/18
As KB suffers from ghosting and multiple images with spectacle wear, he has difficulties viewing computer screens.
Previous Contact Lens Prescription:
RE: 6.77×31/5.78×121
LE: 7.18×153/7.02×7.02×63
Slit Lamp
Cornea clear both eyes. No staining with fluorescein.
Rationale for Fitting Contact Lens of the Invention
Patient preference was for a soft lens option due to previous non tolerance to RGP lenses. Additionally a high water content soft lens would be more suitable for his cornea post CXL as it would act as a bandage lens.
Inventive Contact Lens IC Fitting 77%
RE: 8.20/14.50/STD/STP2/−5.50/−4.00×30 VA 6/6−
LE: 8.00/14.50/STD/−5.00/×1.50×110 VA 6/6−
For the right lens (the only lens with "sector management control"), the information signifies:
8.20 refers to the base curve radius
14.50 the diameter of the lens
STD Standard periphery (equates to a sag of 4.089)
STP2 Steep 2 periphery (equates to a sag of 4.405)
−5.50 Sphere power
−4.00 Cylindrical power
30 Axis of the cylindrical power
VA 6/6− Visual acuity obtained.
SMC Periphery A1: 30/A2: 150/A3: 220/A4: 320 (these figures define the angular position of the sectors)
Acuity very much improved, all day wear attained with excellent comfort in both eyes.
Summary
Keratoconic patient intolerant to RGP lenses considering CXL for left eye. Patient went from Spectacle wear with visual acuities of RE 6/60 LE 6/18 to all day wear clear comfortable vision with inventive contact lenses with visual acuities of RE 6/6− LE 6/6−. Ghosting and multiple images have gone and KB is now able to see to work normally all day long.

The invention claimed is:
1. A method of designing a soft contact lens, said lens having a central optic zone and with a peripheral zone around the central optic zone;
the method comprising the steps of:
    (a) defining a back surface of the lens which is a satisfactory fit to the surface of a subject's cornea;
    (b) defining a front surface of the lens over at least the central optic zone, which surface is selected so as to ameliorate the subject's vision defects;
    (c) checking that the lens meets a desired range of thickness values at one or more selected parts of the lens and, if not, recalculating the front surface over at least the central optic zone so as to meet said desired thickness value range, wherein the lens is to be made of a substance having a Young's modulus in the range 0.08 to 0.40 MPa, and wherein the junction thickness of the lens is in the range 0.15-0.40 mm, and further comprising
    (d) defining one or more positions or loci within the peripheral zone of the lens, and adjusting the sagittal depth of the lens at the one or more defined positions or loci so as to improve the fit of the peripheral zone of the lens to the subject's cornea.
2. A method according to claim 1, wherein the lens is made of a substance having a Young's modulus in the range 0.20 to 0.39 MPa.
3. A method according to claim 1, wherein the junction thickness of the lens is in the range 0.20 to 0.40 mm.
4. A method according to claim 1, wherein the subject has keratoconus.
5. A method according to claim 1, wherein the lens has a default sagittal depth in one or more sectors, and an adjusted sagittal depth, different to that of the default depth, at one or more sectors.
6. A method of making a soft contact lens, the method comprising the steps of:
    (a) designing a soft contact lens according to the method of claim 1, and
    (b) making the designed lens, having the designed front and back surfaces, using a material having a Young's modulus in the range 0.08-0.40 MPa.
7. A method according to claim 6, wherein the lens is made of a silicone hydrogel.
8. A method according to claim 6, wherein the lens is prismatic and had a toric front surface.
9. A lens manufactured according to the method of claim 6.
10. A lens designed according to the method of claim 1.
11. A method of treating a vision defect in a subject with such a vision defect caused by corneal irregularlity, the method comprising the step of providing at least one soft contact lens having a shape adapted to fit an eye of the subject and to ameliorate the vision defect, the lens having a Young's modulus in the range 0.08 to 0.040 MPa, a junction thickness in the range 0.15-0.40 mm, and being designed by the method of claim 1.
12. A method according to claim 11, wherein the subject has a vision defect caused by keratoconus.
13. A method according to claim 11, wherein the lens is made of a substance having a Young's modulus in the range 0.20 to 0.39 MPa.
14. A method according to claim 11, wherein the lens has a junction thickness in the range 0.20 to 0.40 mm.
15. A method according to claim 11, wherein the lens is made of a silicone hydrogel.
16. A method according to claim 11, wherein the lens has a peripheral zone which comprises one or more sectors of a default sagittal depth and one or more sectors having an angular size and a sagittal depth defined to provide an improved fit to the subject's cornea.

* * * * *